United States Patent
Ohl

(10) Patent No.: US 12,093,041 B2
(45) Date of Patent: Sep. 17, 2024

(54) PROCESSING SENSOR DATA IN A MOTOR VEHICLE

(71) Applicant: Elektrobit Automotive GmbH, Erlangen (DE)

(72) Inventor: Sebastian Ohl, Schwalbach a. Ts. (DE)

(73) Assignee: ELEKTROBIT AUTOMOTIVE GMBH, Erlangen (DE)

( * ) Notice: Subject to any disclaimer, the term of this patent is extended or adjusted under 35 U.S.C. 154(b) by 314 days.

(21) Appl. No.: 17/067,112

(22) Filed: Oct. 9, 2020

(65) Prior Publication Data

US 2021/0109526 A1    Apr. 15, 2021

(30) Foreign Application Priority Data

Oct. 11, 2019  (EP) .................................... 19202734

(51) Int. Cl.
*G05D 1/00*    (2024.01)
*B60W 50/00*    (2006.01)
(Continued)

(52) U.S. Cl.
CPC ........... *G05D 1/0088* (2013.01); *B60W 50/00* (2013.01); *G06N 7/01* (2023.01); *G07C 5/08* (2013.01); *B60W 2050/0014* (2013.01)

(58) Field of Classification Search
CPC ............. G05D 1/0088; B60W 50/00; B60W 2050/0014; G06N 7/005; G06N 5/04; G07C 5/08
(Continued)

(56) References Cited

U.S. PATENT DOCUMENTS

| 2010/0023205 A1* | 1/2010 | Schmitt | B60W 50/045 |
| | | | 701/29.2 |
| 2012/0101681 A1* | 4/2012 | Wagner | G01S 15/931 |
| | | | 701/29.2 |

(Continued)

FOREIGN PATENT DOCUMENTS

| DE | 102015118008 | 4/2017 |
| DE | 102017207097 | 10/2018 |

(Continued)

OTHER PUBLICATIONS

Office Action of corresponding European Patent Application No. 19202734.

(Continued)

*Primary Examiner* — Elaine Gort
*Assistant Examiner* — Ellis B. Ramirez
(74) *Attorney, Agent, or Firm* — Cozen O'Connor

(57) ABSTRACT

A method, a computer program comprising instructions, and a device for processing sensor data in a motor vehicle. An assistance system for a motor vehicle in which a method is implemented, and a motor vehicle having such a system. Sensor data is received. At least one algorithm is applied to the sensor data to determine a first intermediate result. At least one rule is applied to the first intermediate result to determine a second intermediate result. The second intermediate result is evaluated with regard to plausibility. If the second intermediate result is implausible, one or more of the rules applied to the first intermediate result is reversed until the second intermediate result is plausible. The second intermediate result thereby obtained is finally output as an end result.

12 Claims, 3 Drawing Sheets

(51) Int. Cl.
*G06N 7/01* (2023.01)
*G07C 5/08* (2006.01)

(58) Field of Classification Search
USPC .................................. 701/23, 27, 44; 706/14
See application file for complete search history.

(56) References Cited

U.S. PATENT DOCUMENTS

| | | | | |
|---|---|---|---|---|
| 2012/0290198 | A1* | 11/2012 | Firl | G08G 1/0133 701/117 |
| 2013/0268519 | A1* | 10/2013 | Cucerzan | G06F 16/951 707/723 |
| 2014/0318209 | A1* | 10/2014 | Reimann | G01D 21/00 73/1.01 |
| 2014/0336866 | A1 | 11/2014 | Kloeden et al. | |
| 2015/0112570 | A1* | 4/2015 | Schmudderich | G06V 20/58 |
| 2015/0112571 | A1* | 4/2015 | Schmudderich | B60W 30/18163 701/1 |
| 2016/0110932 | A1* | 4/2016 | Klein | B60W 50/0205 701/30.3 |
| 2018/0238709 | A1* | 8/2018 | Aucoin | G01S 19/45 |
| 2019/0073545 | A1* | 3/2019 | Dolgov | G06K 9/627 |
| 2019/0152744 | A1* | 5/2019 | Kusserow | B66B 5/0018 |

FOREIGN PATENT DOCUMENTS

| | | | |
|---|---|---|---|
| DE | 102017212507 | A1 * | 1/2019 |
| EP | 2865575 | | 4/2015 |

OTHER PUBLICATIONS

Heiner Versmold et al., "Plausibility Checking of Sensor Signals for Vehicle Dynamics Control Systems", Feb. 1, 2017.
Office Action dated Jun. 14, 2023 issued in European Patent Application No. 19202734.0.

* cited by examiner

PROCESSING SENSOR DATA IN A MOTOR VEHICLE

BACKGROUND OF INVENTION

1. Field of the Invention

The present invention relates to a method, a computer program comprising instructions, and a device for processing sensor data in a motor vehicle. The invention also relates to an assistance system for a motor vehicle in which a method according to the invention is implemented, and to a motor vehicle comprising such an assistance system.

2. Description of Related Art

When realizing projects relating to the processing of sensor data by controllers, once the probabilistic elements of the algorithm have been implemented, hard rules are often introduced to produce a specific behavior in special cases. A hard rule ensures that, on a certain event occurring, an action assigned to this event is carried out. These rules produce the correct adjustments to the outputs in the scenarios envisaged for these rules. It often turns out, however, that these rules are contradictory, or certain combinations of rules result in unwanted behavior. It is therefore a difficult task to harmonize the hard rules in the processing process of sensor data. It can also happen that sets of rules escalate, or certain problems are accepted in rare situations.

SUMMARY OF THE INVENTION

An object of one aspect of the present invention is to provide an improved solution for processing sensor data in a motor vehicle.

According to a first aspect of the invention, a method for processing sensor data in a motor vehicle comprises:
receiving sensor data;
applying at least one algorithm to the sensor data in order to determine a first intermediate result;
applying at least one rule to the first intermediate result in order to determine a second intermediate result;
evaluating the second intermediate result with regard to plausibility;
if the second intermediate result is implausible, reversing one or more of the rules applied to the first intermediate result until the second intermediate result is plausible; and
outputting the second intermediate result as an end result.

According to one aspect of the invention, a computer program comprises instructions which, when executed by a computer, cause the computer to perform the following steps for processing sensor data in a motor vehicle:
receiving sensor data;
applying at least one algorithm to the sensor data in order to determine a first intermediate result;
applying at least one rule to the first intermediate result in order to determine a second intermediate result;
evaluating the second intermediate result with regard to plausibility;
if the second intermediate result is implausible, reversing one or more of the rules applied to the first intermediate result until the second intermediate result is plausible; and
outputting the second intermediate result as an end result.

The term computer is intended in a broad sense here. In particular, it includes also controllers and other processor-based data processing devices.

The computer program can be provided for electronic retrieval or stored on a non-transient computer-readable storage medium, for example.

According to one aspect of the invention, a device for processing sensor data in a motor vehicle comprises:
an input for receiving sensor data;
a data processing unit for applying at least one algorithm to the sensor data in order to determine a first intermediate result, and for applying at least one rule to the first intermediate result in order to determine a second intermediate result;
an evaluation unit for evaluating the second intermediate result with regard to plausibility, wherein the data processing unit is configured to reverse, in the event that the second intermediate result is implausible, one or more of the rules applied to the first intermediate result until the second intermediate result is plausible; and
an output for outputting the second intermediate result as an end result.

In the solution according to one aspect of the invention, a post-evaluation of the applied sets of rules is introduced. In this process, a metric is used to evaluate whether the output data resulting from the processing of the sensor data is plausible. For example, for lane estimation, the two lane edges are not allowed to cross. If the output data is implausible, individual rules can be reversed until a plausible result exists. The post-evaluation thus makes it possible to correct the effects of rarely used rules in incorrect situations. The additional memory space needed for implementing the solution according to the invention and the additional processing complexity for reversing rules is not relevant when balanced against the safety gain.

According to an aspect of the invention, the rules also provide an inverse effect in addition to an effect. This simplifies the reversal of rules, because the effects of a rule can easily be removed again. For example, the rules can be implemented in a similar way to a command pattern.

According to an aspect of the invention, the rules applied to the first intermediate result are entered in a list. Each rule that is activated is added to this list, and the result of the processing of the sensor data adjusted correspondingly. By using a list, it is easily possible to track which rules specifically have been applied to the sensor data in which order.

According to an aspect of the invention, the rules applied to the first intermediate result are sorted in the list by a priority of the rules. The priority of a rule can be dependent here on which other rules have been applied. It is possible to establish by prioritizing the rules, which rule is probably the most unlikely in the current situation. When reversing rules, the low-priority rules can then be reversed first on the basis of the sorted list. The prioritization hence simplifies the decision about the order in which rules are meant to be reversed, thereby reducing the processing complexity.

According to an aspect of the invention, the processing of the sensor data is performed for an assisted or automated driving function. In this context, using the solution according to one aspect of the invention it is possible to achieve, inter alia, that rarely used rules, for example, are not activated in situations in which their activation tends to be harmful rather than helpful.

A solution according to one aspect of the invention is preferably used in an autonomous or semi-autonomous motor vehicle, or in a motor vehicle equipped with assistance systems, for instance in a passenger motor vehicle or in a utility vehicle. In particular in this case, the solution according to one aspect of the invention can be used by an assistance system, for instance by a system for an assisted or automated driving function. Further features of the present invention are given in the following description and the accompanying claims in conjunction with the figures.

DETAILED DESCRIPTION OF THE PRESENTLY PREFERRED EMBODIMENTS

For a better understanding of the principles of aspects of the present invention, embodiments of the invention are described below in greater detail with reference to the figures. The same reference signs are used in the figures for identical elements or elements having an equivalent effect, and are not necessarily described again for each figure. It is obvious that the invention is not restricted to the embodiments presented, and that the described features can also be combined or modified without departing from the scope of protection of the invention as defined in the accompanying claims.

Figure 1:
FIG. 1 schematically shows a typical procedure for sensor data processing in a controller according to the prior art.

FIG. 1 schematically shows a typical procedure for sensor data processing in a controller according to the prior art. First, at least one algorithm A, for instance a probabilistic algorithm, is applied to the received sensor data SD. This produces an intermediate result $E_1$, which in most cases is adequate. In order to deal with special cases, hard rules $R_i$ are additionally implemented, which are applied to the intermediate result $E_1$. The result that is obtained from applying the rules $R_i$ is output as an end result E.

Figure 2:
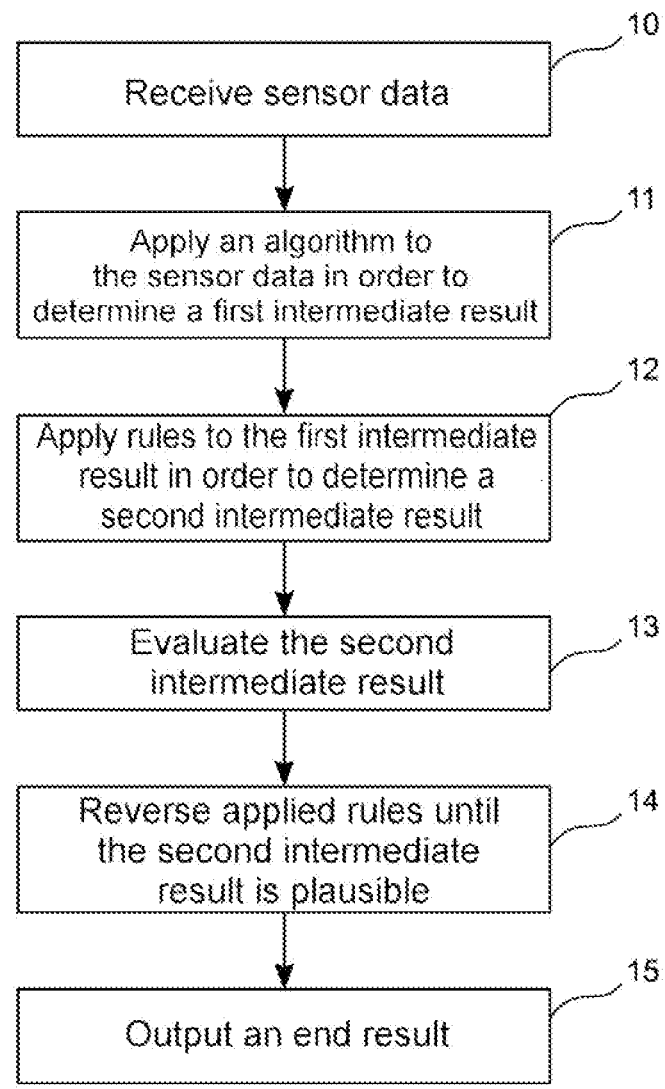
FIG. 2 schematically shows a method for processing sensor data in a motor vehicle.

FIG. 2 schematically shows a method for processing sensor data in a motor vehicle, for instance for an assisted or automated driving function. Sensor data is received 10 in a first step. At least one algorithm is applied 11 to the sensor data to determine a first intermediate result. Then at least one rule is applied 12 to the first intermediate result in order to determine a second intermediate result. The second intermediate result is then evaluated 13 with regard to plausibility. If the second intermediate result is implausible, at least one of the rules applied to the first intermediate result is reversed 14 until the second intermediate result is plausible. For this purpose, the rules can also provide an inverse effect in addition to an effect. The second intermediate result thereby obtained is finally output 15 as an end result. In order to simplify the reversal, the rules applied to the first intermediate result can be entered in a list, for instance sorted by a priority of the rules. The priority of a rule can be dependent here on which other rules have been applied.

Figure 3:
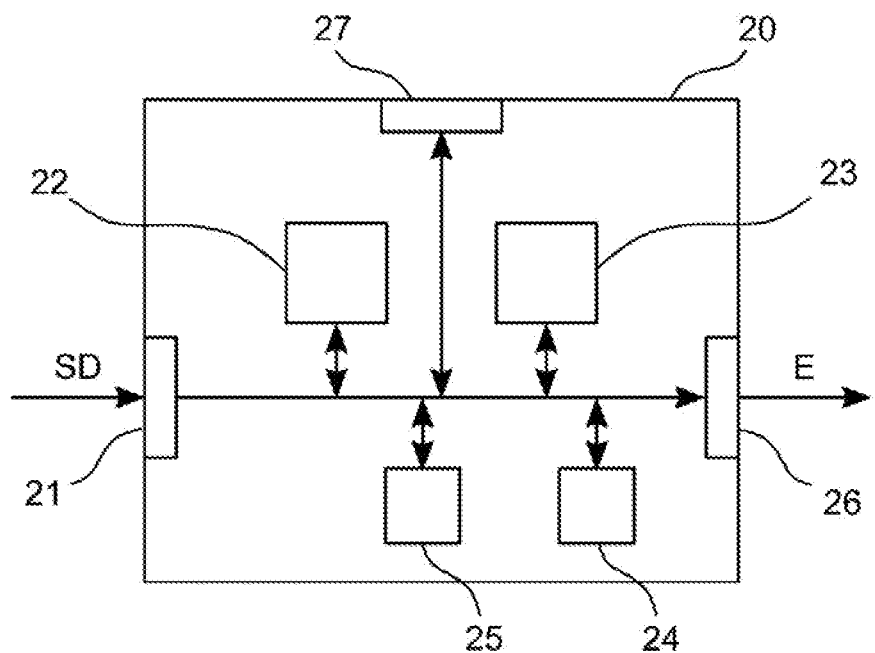
FIG. 3 schematically shows a first embodiment of a device for processing sensor data in a motor vehicle.

FIG. 3 shows a simplified schematic diagram of a first embodiment of a device 20 for processing sensor data in a motor vehicle, for instance for an assisted or automated driving function. The device 20 has an input 21, via which sensor data SD can be received. A data processing unit 22 applies at least one algorithm to the sensor data in order to determine a first intermediate result. In addition, the data processing unit 22 applies at least one rule to the first intermediate result in order to determine a second intermediate result. An evaluation unit 23 evaluates the second intermediate result with regard to plausibility. The data processing unit 22 is configured here to reverse, in the event that the second intermediate result is implausible, one or more of the rules applied to the first intermediate result. For this purpose, the rules can also provide an inverse effect in addition to an effect. This process is repeated until the second intermediate result is plausible. The second intermediate result obtained therefrom is finally output as an end result E via an output 26 of the device for further processing. In order to simplify the reversal, the rules applied to the first intermediate result can be entered in a list, for instance sorted by a priority of the rules. The priority of a rule can be dependent here on which other rules have been applied.

The data processing unit 22 and the evaluation unit 23 can be controlled by a control unit 24. Settings for the data processing unit 22, the evaluation unit 23 or the control unit 24 can be altered, if applicable, via a user interface 27. The data that accrues in the device 20 can be stored, if required, in a memory 25 of the device 20, for instance for later analysis or for use by the components of the device 20. The data processing unit 22, the evaluation unit 23 and the control unit 24 can be implemented as dedicated hardware, for example as integrated circuits. Of course it is also possible, however, that they are also partially or entirely combined or implemented as software running on a suitable processor, for instance on a GPU or a CPU. The input 21 and the output 26 can be implemented as separate interfaces or as a combined bidirectional interface.

Figure 4:
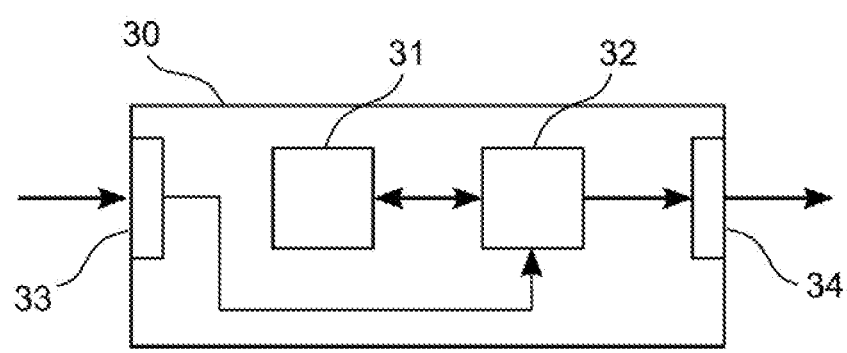
FIG. 4 schematically shows a second embodiment of a device for processing sensor data in a motor vehicle.

FIG. 4 is a simplified schematic diagram of a second embodiment of a device 30 for processing sensor data in a motor vehicle. The device 30 comprises a processor 32 and a memory 31. The device 30 is a computer or a graphics chip, for example. Stored in the memory 31 are instructions that, when executed by the processor 32, cause the device 30 to perform the steps according to one of the described methods. The instructions stored in the memory 31 thus embody a program that can be executed by the processor 32 and implements the method according to aspects of the invention. The device 30 has an input 33 for receiving information, in particular sensor data from sensors of the motor vehicle. Data generated by the processor 32 is provided via an output 34. This data can also be stored in the memory 31. The input 33 and the output 34 can be combined into a bidirectional interface.

The processor 32 can comprise one or more processor units, for instance microprocessors, digital signal processors or combinations thereof.

The memories 25, 31 of the devices described can comprise both volatile and non-volatile memory areas, and can include the widest possible range of storage devices and storage media, for instance hard disks, optical storage media, or semiconductor memories.

Figure 5:
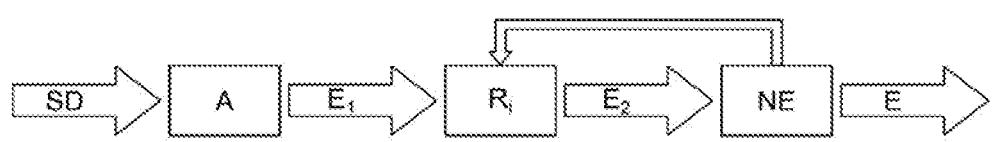
FIG. 5 schematically shows a procedure for sensor data processing according to the invention.

FIG. 5 schematically shows a typical procedure for sensor data processing according to the invention. As already shown in FIG. 1, an algorithm A is first applied to the received sensor data SD in order to obtain a first intermediate result $E_1$. In order to deal with special cases, hard rules $R_i$ are then applied to the first intermediate result $E_1$. Unlike the procedure shown in FIG. 1, however, the result obtained from applying the rules $R_i$ constitutes a second intermediate result $E_2$. Before this is output as an end result E, a post-evaluation NE of the applied set of rules is performed. The post-evaluation NE involves evaluating the second intermediate result $E_2$ with regard to plausibility. In this process, the application of individual rules can be reversed until a plausible condition has been established. The intermediate result $E_2$ obtained therefrom is finally output as an end result E.

Figure 6:
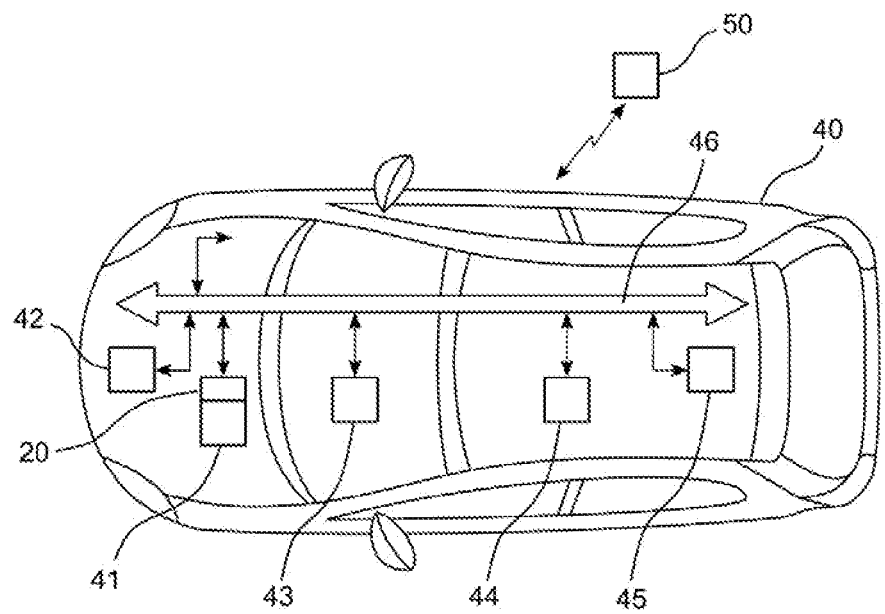
FIG. 6 schematically shows a motor vehicle in which a solution according to the invention is implemented.

FIG. 6 schematically shows a motor vehicle 40 in which a solution according to one aspect of the invention is implemented. For example, the motor vehicle 40 is an autonomous or semi-autonomous motor vehicle, or a motor vehicle equipped with an assistance system. The motor vehicle 40 comprises at least one assistance system 41 and a device 20 for processing sensor data for the assistance system 41. The device 20 can obviously also be integrated in the assistance system 41. The motor vehicle 40 also comprises a sensor system 42, which can be used to acquire the sensor data. The sensor system 42 can comprise in particular sensors for environment recognition, for instance ultrasonic sensors, laser scanners, radar sensors, lidar sensors, or cameras. In this example, further components of the motor vehicle 40 are a navigation system 43 and a data transfer unit 44. The data transfer unit 44 can be used to establish a connection to a backend 50, for instance in order to transmit new or updated rules. A memory 45 is present for storing data. Data is exchanged between the various components of the motor vehicle 40 via a network 46.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for processing sensor data in a motor vehicle, comprising:
   receiving sensor data;
   applying at least one algorithm to the sensor data to determine a first intermediate result;
   applying one or more rules to the first intermediate result to determine a second intermediate result;
   tracking the order in which the rules are applied;
   entering the one or more rules applied to the first intermediate result in a list;
   sorting the one or more rules applied to the first intermediate result in the list by a priority of the one or more rules;
   evaluating the second intermediate result with regard to plausibility;
   if the second intermediate result is implausible, reversing one or more of the one or more rules applied to the first intermediate result until the second intermediate result is plausible;
   outputting the second intermediate result as an end result; and
   using the end result to at least partially control an assisted or an automated driving function.

2. The method as claimed in claim 1, wherein the one or more rules also provide an inverse effect in addition to an effect.

3. The method as claimed in claim 1, wherein the priority of a rule is dependent on which other rules have been applied.

4. The method as claimed in claim 1, wherein the processing of the sensor data is performed for an assisted or automated driving function.

5. The method as claimed in claim 1, wherein the one or more rules are applied in a specific order.

6. The method as claimed in claim 1, wherein when reversing rules, low-priority rules are reversed first based on a sorted list.

7. The method as claimed in claim 1, further comprising:
   determining if prior activation of a respective rule yielded implausible results based on the sensor data and removing the respective rule from a plurality of rules; and
   selecting one or more rules from the plurality of rules based on the sensor data.

8. The method as claimed in claim 1, further comprising:
   receiving one or more new rules and/or updated rules.

9. A computer program comprising instructions stored on a nontransitory computer readable medium, which, when executed by a computer, cause the computer to process sensor data in a motor vehicle, comprising:
   receive the sensor data;
   apply at least one algorithm to the sensor data to determine a first intermediate result;
   apply one or more rules to the first intermediate result to determine a second intermediate result;
   track the order in which the rules are applied;
   enter the one or more rules applied to the first intermediate result in a list;
   sort the one or more rules applied to the first intermediate result in the list by a priority of the one or more rules;
   evaluate the second intermediate result with regard to plausibility;
   if the second intermediate result is implausible, reverse the application of one or more of the one or more rules applied to the first intermediate result until the second intermediate result is plausible; and
   output the second intermediate result as an end result; and
   use the end result to at least partially control an assisted or an automated driving function.

10. A device for processing sensor data in a motor vehicle, comprising:
    an input configured to receive the sensor data;
    a data processing unit configured to apply at least one algorithm to the sensor data to determine a first intermediate result, for applying one or more rules to the first intermediate result to determine a second intermediate result, and tracking the order in which the rules are applied;
    an evaluation unit configured to evaluate the second intermediate result with regard to plausibility,
    wherein the data processing unit is configured to reverse, in event that the second intermediate result is implausible, the application of one or more of the one or more rules applied to the first intermediate result until the second intermediate result is plausible; and an output configured to output the plausible second intermediate result as an end result, wherein the one or more rules applied to the first intermediate result are entered in a list, and wherein the one or more rules applied to the first intermediate result are sorted in the list by a priority of the one or more rules; and using the end result to at least partially control an assisted or an automated driving function.

11. An assistance system for a motor vehicle, characterized in that the assistance system is configured to perform a method for processing sensor data comprising:

receiving the sensor data;

applying at least one algorithm to the sensor data to determine a first intermediate result;

applying one or more rules to the first intermediate result to determine a second intermediate result;

tracking the order in which the rules are applied;

entering the one or more rules applied to the first intermediate result in a list;

sorting the one or more rules applied to the first intermediate result in the list by a priority of the one or more rules;

evaluating the second intermediate result with regard to plausibility;

if the second intermediate result is implausible, reversing the application of one or more of the one or more rules applied to the first intermediate result until the second intermediate result is plausible;

outputting the second intermediate result as an end result; and using the end result to at least partially control an assisted or an automated driving function.

12. A motor vehicle comprising the assistance system as claimed in claim 11.

* * * * *